No. 828,143. PATENTED AUG. 7, 1906.
T. W. W. SMITH.
PISTON PACKING.
APPLICATION FILED MAR. 2, 1906.
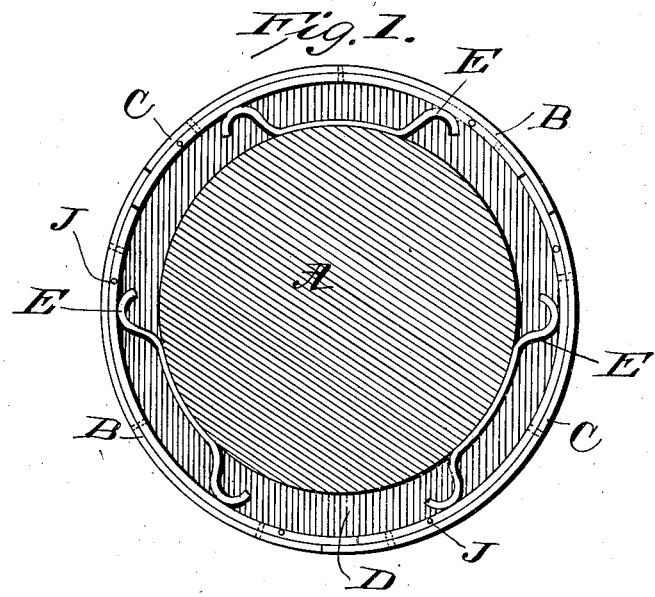
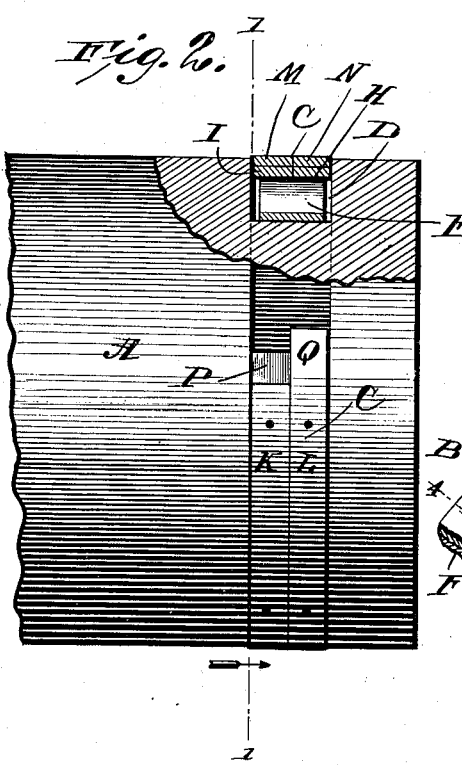
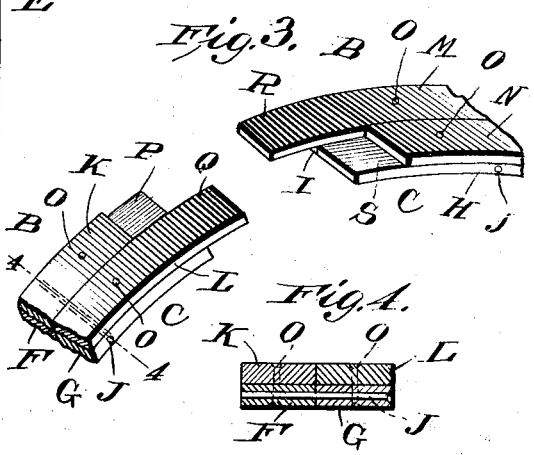
WITNESSES:
E. M. Callaghan
Harrison B Brown
INVENTOR
THOMAS W. W. SMITH
BY Munn & Co.
ATTORNEYS

UNITED STATES PATENT OFFICE.

THOMAS WALLACE WILLIAM SMITH, OF BALTIMORE, MARYLAND.

PISTON-PACKING.

No. 828,143. Specification of Letters Patent. Patented Aug. 7, 1906.

Application filed March 2, 1906. Serial No. 303,823.

*To all whom it may concern:*

Be it known that I, THOMAS WALLACE WILLIAM SMITH, a citizen of the United States, and a resident of Baltimore, in the State of Maryland, have invented a new and Improved Piston-Packing, of which the following is a specification.

This invention relates to packing, commonly known as "packing-rings," for pistons, and has for its object certain improvements in the construction thereof over similar packing as same has heretofore been fashioned, the same to be effective to an improved degree and adapted for use on pistons, rods, and other similar reciprocated bodies requiring packing therebetween and their inclosing body.

The invention consists of the special construction, arrangement, and combination of parts shown by the accompanying drawings, hereinafter fully described, and as pointed out in the appended claims.

In the drawings, Figure 1 is a transverse sectional view taken on line 1 1 of Fig. 2 through a conventional form of piston, showing my invention in use. Fig. 2 is a view showing a fragmentary portion of a common form of piston with my improved packing arranged thereon, the packing and piston being illustrated, part broken away and in section. Fig. 3 is a perspective view showing two adjacent broken-away ends of my packing-ring, and Fig. 4 is a transverse sectional view taken on the line 4 4 of Fig. 2. Fig. 5 is a transverse sectional view in illustration of another construction of my packing-ring.

My invention may be characterized as a piston or other similar packing-ring, employing a series of segments constructed into attached parallel transversely-disposed sections with the sections fashioned into novel arrangement of attached layers, one upon the other, leaving the ends of the layers in one transverse plane of a ring-segment projecting in staggered relation and with the ends of another transverse plane of layers attached to the aforesaid plane of layers arranged projecting in reversed staggered relation, adapting the segments to be assembled into ring form, with their ends lockedly jointed together.

In the practice of my invention, adapting same for use as packing on an ordinary form of reciprocating piston A, the packing is constructed into two or more curved segments B, adapted for arrangement end to end into an annular body or packing-ring C.

The piston A is provided with a suitable encircling groove D, adapted to receive the packing-ring, and in said groove I arrange a series of springs E, adapted for yieldingly supporting the ring-segments B flush with or slightly beyond the cylindrical outer surface of the piston, substantially as shown by Figs. 1 and 2.

In contructing the ring-segments I employ a series of suitable plates F G in one segment B and a like series of plates H I in an adjoining segment of the packing-ring. The plates F G of one segment and the similar plates H I of the next adjoining segment are arranged in parallel flat plane and secured together by transversely-disposed rivets J. Upon the plates F G of one segment B, I arrange similar plates K L and arrange like plates M N upon the plates H I of an adjoining segment B. The plates K L and M N are secured to the inner plates F G and H I by suitable rivets O. According to my invention the plate K in one segment is arranged upon the inner plate F, leaving a projecting end P of the latter plate, and the similar plate L is arranged on the plate G in the same segment, with its end Q disposed projecting beyond the end of the inner similar plate G, substantially as illustrated in Fig. 3. The ends of the adjoining ring-segment are formed substantially like the segment end above described, save that the end R of the plate M is disposed projecting beyond the end of the inner similar plate I, adapted to overlie the projecting end P of the plate F in abutting segment and the end of the plate N located back on the plate H, leaving the latter, with projecting end S, adapted for arrangement underlying the projecting end Q of the plate L.

Now it is apparent that when the several segments B are arranged end to end, forming an annular body, with the ends of the several plates disposed into the overlying and underlying position above described and as will be understood upon reference to Fig. 3, that the completed packing-ring C, when arranged in its holding-groove D in a piston A or other similar operating-body, that the segments are lockedly connected together by means permitting of obvious yielding action in the packing and at the same time through extending a portion of the respective segments to overlying position on the adjoining segment, providing substantially an unbroken coupling of the several segments adapted to lockedly hold them together and at the same time afford an effective packing around the piston, insuring against leakage in its overriding port action.

Having thus described my improved packing-ring in detail, the advantages thereof will be apparent; but I would call particular attention to the fact that a packing-ring formed of segments constructed of a series of plates in lamination, one upon the other, and riveted together, and several aforesaid series of plates arranged in transverse plane and riveted together, as shown by Figs. 3 and 4, is novel to improved degree, in that when the outer plates K L M N become worn the packing-ring may be removed and the worn plates readily detached through use of means obvious and not necessary to describe. When the outer or worn plates are removed, as above described, the inner plates may be rearranged in the piston-groove and used the same as an ordinary packing-ring.

From the foregoing description it is apparent that my novel packing-ring is useful to an improved degree not only by reason of the peculiar splicing-joint for coupling of the ring-segments end to end, but in being constructed adapted to be formed into practically a new packing-ring through simple removal of its outer or worn portion, as hereinbefore fully described.

In Fig. 5 of my drawings I illustrate another construction of my packing-ring, the same differing from the form illustrated in the other figures of the drawings, in that the sections K L are one integral body instead of being constructed of superimposed plates.

What I claim is—

1. A packing-ring formed of a series of segments, the segments being constructed of a series of plates arranged securedly, one upon the other, and a like series of plates disposed in alinement, and secured to the aforesaid series thereof, and means adapted for lockedly connecting the ends of the ring-segments, substantially as described.

2. A packing-ring employing a series of plates arranged and secured one upon the other, a like series of arranged and secured plates secured to the aforesaid series thereof, in lengthwise lateral plane therewith, and a joint in the packing-ring employing extensions of the secured plates, with said extension of the respective plates adapted for reversed overlying and underlying arrangement, substantially as described.

3. The combination in a packing-ring, of a series of segments, the segments consisting of a series of plates arranged one upon the other and secured by suitable rivets, and a like series of arranged and secured plates, suitably riveted to the aforesaid series thereof, the inner plates being arranged with flush ends and the next or outer plates arranged with one thereof disposed projecting, and the other with its end located suitably back from the flush ends of the inner plates.

THOMAS WALLACE WILLIAM SMITH.

Witnesses:
 THOMAS HANRATTY,
 JOS. O'CONNOR.